US012620094B2

(12) United States Patent

Ogasawara

(10) Patent No.: US 12,620,094 B2
(45) Date of Patent: May 5, 2026

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Aya Ogasawara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 247 days.

(21) Appl. No.: 18/525,701

(22) Filed: Nov. 30, 2023

(65) Prior Publication Data

US 2024/0095921 A1     Mar. 21, 2024

Related U.S. Application Data

(63) Continuation of application No. PCT/JP2022/018958, filed on Apr. 26, 2022.

(30) Foreign Application Priority Data

Jun. 25, 2021     (JP) ................................. 2021-105654

(51) Int. Cl.
G06T 7/00            (2017.01)
(52) U.S. Cl.
CPC .. G06T 7/0012 (2013.01); *G06T 2207/30096* (2013.01)
(58) Field of Classification Search
CPC ......... G06T 7/0012; G06T 2207/30096; G06T 2207/10081; G06T 2207/10088; G06T 2207/10104; G06T 2207/20084; G06T 7/11; A61B 5/055; A61B 6/03

USPC .......................................................... 382/128
See application file for complete search history.

(56) References Cited

U.S. PATENT DOCUMENTS

| | | | |
|---|---|---|---|
| 2011/0069874 A1 | 3/2011 | Nagao | |
| 2014/0088416 A1 | 3/2014 | Sakuragi | |
| 2014/0316758 A1 | 10/2014 | Yagi et al. | |
| 2014/0343906 A1 | 11/2014 | Yagi et al. | |
| 2015/0032435 A1 | 1/2015 | Yagi et al. | |
| 2015/0127031 A1 | 5/2015 | Yagi et al. | |
| 2015/0178989 A1 | 6/2015 | Itai | |
| 2022/0270246 A1* | 8/2022 | Chino | A61B 34/10 |

FOREIGN PATENT DOCUMENTS

| | | | |
|---|---|---|---|
| JP | 2014054359 | 3/2014 | |
| JP | 2014064824 | 4/2014 | |
| JP | 2016087139 | 5/2016 | |
| JP | 2018175379 | 11/2018 | |
| JP | 2023059146 A * | 4/2023 | G06T 7/162 |

(Continued)

OTHER PUBLICATIONS

"International Search Report (Form PCT/ISA/210) of PCT/JP2022/018958", mailed on Jun. 21, 2022, with English translation thereof, pp. 1-5.

(Continued)

*Primary Examiner* — Neil R McLean
(74) *Attorney, Agent, or Firm* — JCIPRNET

(57)     ABSTRACT
A processor is configured to extract a tubular tissue region from a medical image including a tubular tissue, extract a lesion region in a periphery of the tubular tissue region from the medical image, and correct an extraction result of the tubular tissue region, as necessary, based on positional information of the lesion region.

17 Claims, 9 Drawing Sheets

(56) References Cited

FOREIGN PATENT DOCUMENTS

| WO | 2009145170 | 12/2009 |
| WO | 2013031744 | 3/2013 |
| WO | 2019238754 | 12/2019 |

OTHER PUBLICATIONS

"Written Opinion of the International Searching Authority (Form PCT/ISA/237) of PCT/JP2022/018958", mailed on Jun. 21, 2022, with English translation thereof, pp. 1-8.
"Notice of Reasons for Refusal of Japan Counterpart Application No. 2023-529660", issued on Jan. 6, 2026, with English translation thereof, p. 1-p. 6.

* cited by examiner

60

61

62

63

64

IMAGE PROCESSING APPARATUS, IMAGE PROCESSING METHOD, AND IMAGE PROCESSING PROGRAM

CROSS-REFERENCE TO RELATED APPLICATIONS

This application is a continuation of International Application No. PCT/JP2022/018958, filed on Apr. 26, 2022, which claims priority from Japanese Patent Application No. 2021-105654, filed on Jun. 25, 2021. The entire disclosure of each of the above applications is incorporated herein by reference.

BACKGROUND

Technical Field

The present disclosure relates to an image processing apparatus, an image processing method, and an image processing program.

Related Art

In recent years, tubular tissues such as a large intestine, a small intestine, a bronchus, and blood vessels of a patient have been extracted from a three-dimensional image captured by a computed tomography (CT) apparatus, a magnetic resonance imaging (MRI) apparatus, or the like, and three-dimensional images of the extracted tubular tissues have been used for image diagnosis. However, in a case in which fat, plaque, or the like adheres to the tubular tissue and the tubular tissue is blocked, the tubular tissue may be separated and extracted from the three-dimensional image. Therefore, a method of specifying separated parts of the tubular tissue extracted from the three-dimensional image, specifying routes of the separated tubular tissue, and interpolating and displaying the specified route in a case of displaying the three-dimensional image has been proposed (for example, refer to JP2014-064824A and JP2014-054359A).

However, in the method disclosed in JP2014-064824A and JP2014-054359A, since the tubular tissue in which the separated parts are interpolated is displayed, even in a case in which the tubular tissue is actually separated due to the presence of a lesion, the tubular tissue is interpolated and displayed. Therefore, in the method disclosed in JP2014-064824A and JP2014-054359A, there is a problem that it is difficult to discern whether the extracted tubular tissue is actually separated.

SUMMARY OF THE INVENTION

The present disclosure has been made in view of the above circumstances, and an object of the present disclosure is to improve the extraction accuracy of the tubular tissue in consideration of whether or not the tubular tissue is actually separated.

The present disclosure relates to an image processing apparatus comprising at least one processor, in which the processor is configured to:

extract a tubular tissue region from a medical image including a tubular tissue;

extract a lesion region in a periphery of the tubular tissue region from the medical image; and correct an extraction result of the tubular tissue region, as necessary, based on positional information of the lesion region.

It should be noted that, in the image processing apparatus according to the present disclosure, the processor may be configured to:

specify separated parts in the tubular tissue region;

determine whether or not to connect the separated parts of the tubular tissue region based on the positional information of the lesion region; and correct the extraction result of the tubular tissue region such that the separated parts in the tubular tissue region are connected, in a case in which it is determined that the separated parts are to be connected.

In addition, in the image processing apparatus according to the present disclosure, the processor may be configured to determine whether or not the lesion region is present in the separated parts based on the positional information of the lesion region, and determine to connect the separated parts in a case in which it is determined that the lesion region is absent in the separated parts.

In addition, in the image processing apparatus according to the present disclosure, the processor may be configured to function as a trained model that outputs the medical image in which the extraction result of the tubular tissue region is corrected, as necessary, in a case in which the medical image, the tubular tissue region, and the positional information of the lesion region are input.

In addition, in the image processing apparatus according to the present disclosure, the processor may be configured to display the medical image such that whether the tubular tissue region has been corrected or not is distinguishable.

In addition, in the image processing apparatus according to the present disclosure, the processor may be configured to display the medical image such that a corrected part in the tubular tissue region is distinguishable in a case in which the extraction result of the tubular tissue region has been corrected.

In addition, in the image processing apparatus according to the present disclosure, the processor may be configured to correct a route of the tubular tissue region in response to an instruction to correct the route of the tubular tissue region for the medical image.

In addition, in the image processing apparatus according to the present disclosure, the tubular tissue may be a main pancreatic duct, and the lesion region may be a lesion region in a pancreas.

The present disclosure relates to an image processing method comprising:

extracting a tubular tissue region from a medical image including a tubular tissue;

extracting a lesion region in a periphery of the tubular tissue region from the medical image; and correcting an extraction result of the tubular tissue region, as necessary, based on positional information of the lesion region.

It should be noted that a program for causing a computer to execute the image processing method according to the present disclosure may be provided.

According to the present disclosure, it is possible to improve the extraction accuracy of the tubular tissue in consideration of whether or not the tubular tissue is actually separated.

DETAILED DESCRIPTION

Figure 1:
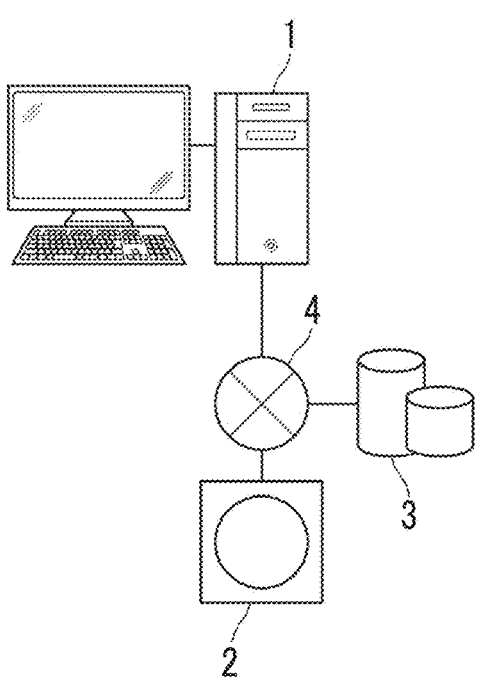
FIG. 1 is a diagram illustrating a schematic configuration of a diagnosis support system to which an image processing apparatus according to a first embodiment of the present disclosure is applied.

In the following, embodiments of the present disclosure will be explained with reference to the drawings. First, a configuration of a medical information system to which an image processing apparatus according to the present embodiment is applied will be described. FIG. 1 is a diagram illustrating a schematic configuration of the medical information system. In the medical information system illustrated in FIG. 1, a computer 1 including the image processing apparatus according to the present embodiment, an imaging apparatus 2, and an image storage server 3 are connected via a network 4 in a communicable state.

The computer 1 includes the image processing apparatus according to the present embodiment, and an image processing program according to the present embodiment is installed in the computer 1. The computer 1 may be a workstation or a personal computer directly operated by a doctor who makes a diagnosis, or may be a server computer connected to the workstation or the personal computer via the network. The image processing program is stored in a storage device of the server computer connected to the network or in a network storage to be accessible from the outside, and is downloaded and installed in the computer 1 used by the doctor, in response to a request. Alternatively, the image processing program is distributed in a state of being recorded on a recording medium, such as a digital versatile disc (DVD) or a compact disc read only memory (CD-ROM), and is installed in the computer 1 from the recording medium.

The imaging apparatus 2 is an apparatus that images a diagnosis target part of a subject to generate a three-dimensional image showing the part and is, specifically, a CT apparatus, an MRI apparatus, a positron emission tomography (PET) apparatus, and the like. The three-dimensional image consisting of a plurality of tomographic images generated by the imaging apparatus 2 is transmitted to and stored in the image storage server 3. It should be noted that, in the present embodiment, the imaging apparatus 2 is a CT apparatus, and a CT image of a thoracoabdominal portion of the subject is generated as the three-dimensional image. It should be noted that the acquired CT image may be a contrast CT image or a non-contrast CT image.

The image storage server 3 is a computer that stores and manages various types of data, and comprises a large-capacity external storage device and database management software. The image storage server 3 communicates with another device via the wired or wireless network 4, and transmits and receives image data and the like to and from the other device. Specifically, the image storage server 3 acquires various types of data including the image data of the three-dimensional image generated by the imaging apparatus 2 via the network, and stores and manages the various types of data in the recording medium, such as the large-capacity external storage device. It should be noted that the storage format of the image data and the communication between the devices via the network 4 are based on a protocol, such as digital imaging and communication in medicine (DICOM).

Figure 2:
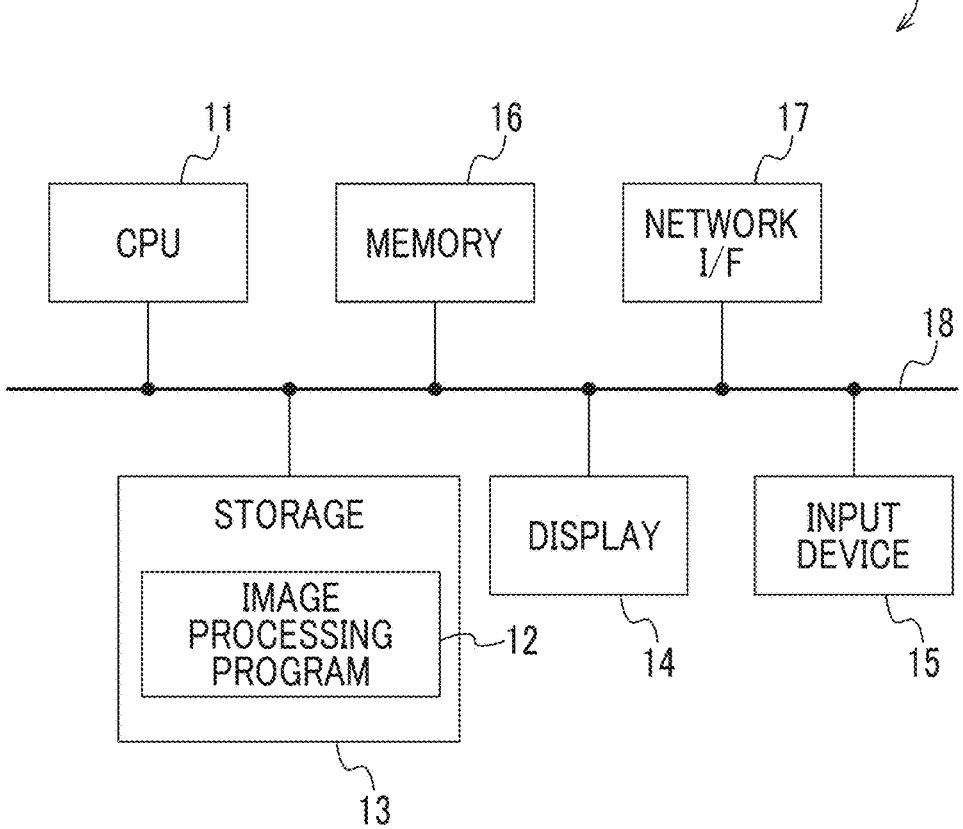
FIG. 2 is a diagram illustrating a schematic configuration of the image processing apparatus according to the first embodiment.

Next, the image processing apparatus according to the present embodiment will be described. FIG. 2 is a diagram illustrating a hardware configuration of the image processing apparatus according to the present embodiment. As illustrated in FIG. 2, the image processing apparatus 20 includes a central processing unit (CPU) 11, a non-volatile storage 13, and a memory 16 as a transitory storage region. In addition, the image processing apparatus 20 includes a display 14, such as a liquid crystal display, an input device 15, such as a keyboard and a mouse, and a network interface (I/F) 17 connected to the network 4. The CPU 11, the storage 13, the display 14, the input device 15, the memory 16, and the network OF 17 are connected to a bus 18. It should be noted that the CPU 11 is an example of a processor according to the present disclosure.

The storage 13 is realized by a hard disk drive (HDD), a solid state drive (SSD), a flash memory, and the like. An image processing program 12 is stored in the storage 13 as a storage medium. The CPU 11 reads out the image processing program 12 from the storage 13, develops the image processing program 12 in the memory 16, and executes the developed image processing program 12.

Figure 3:
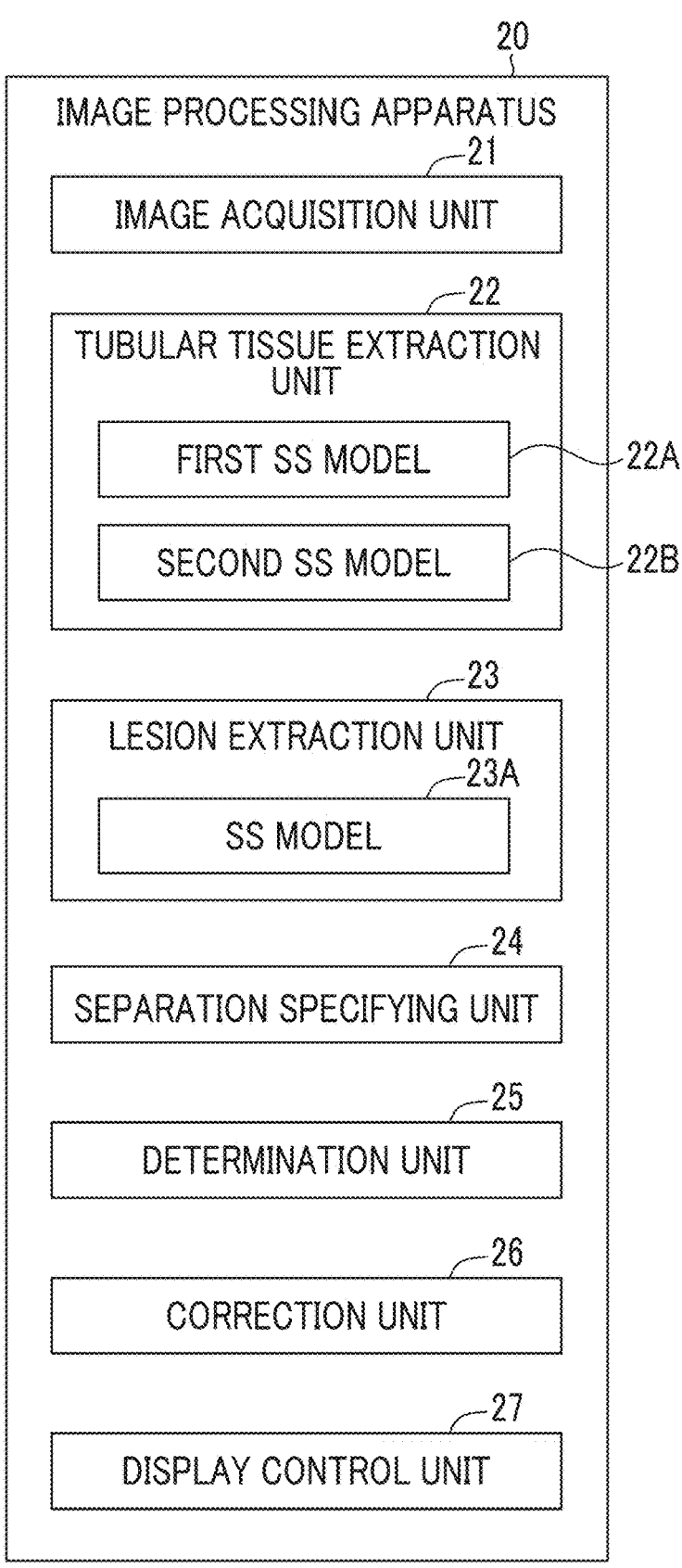
FIG. 3 is a functional configuration diagram of the image processing apparatus according to the first embodiment.

Hereinafter, a functional configuration of the image processing apparatus according to the present embodiment will be described. FIG. 3 is a diagram illustrating the functional configuration of the image processing apparatus according to the present embodiment. As illustrated in FIG. 3, the image processing apparatus 20 comprises an image acquisition unit 21, a tubular tissue extraction unit 22, a lesion extraction unit 23, a separation specifying unit 24, a determination unit 25, a correction unit 26, and a display control unit 27. By executing the image processing program 12 by the CPU 11, the CPU 11 functions as the image acquisition unit 21, the tubular tissue extraction unit 22, the lesion extraction unit 23, the separation specifying unit 24, the determination unit 25, the correction unit 26, and the display control unit 27.

The image acquisition unit 21 acquires a target image G0 that is a processing target from the image storage server 3 in response to an instruction from the input device 15 by an operator. In the present embodiment, the target image G0 is the CT image including the plurality of tomographic images including the thoracoabdominal portion of the human body as described above. The target image G0 is an example of a medical image according to the present disclosure.

The tubular tissue extraction unit 22 extracts a tubular tissue region from the target image. In the present embodiment, the tubular tissue extraction unit 22 extracts a region of a main pancreatic duct of the pancreas included in the target image G0 as the tubular tissue region. To this end, the tubular tissue extraction unit 22 first extracts the pancreas from the target image G0, and extracts the main pancreatic duct in the extracted pancreas.

The tubular tissue extraction unit 22 includes a semantic segmentation model (hereinafter, referred to as a SS model) subjected to machine learning to extract the pancreas from the target image G0, and a SS model subjected to machine learning to extract the main pancreatic duct. The former is a first SS model 22A, and the latter is a second SS model 22B. As is well known, each SS model 22A and 22B is a machine learning model that outputs an output image in which a label representing an extraction object (class) is assigned to each pixel of the input image. In the present embodiment, the input image of the first SS model 22A is a tomographic image constituting the target image G0, the extraction object is the pancreas, and the output image is an image in which a region of the pancreas is labeled. The input image of the second SS model 22B is the image of the region of the extracted pancreas, the extraction object is the main pancreatic duct, and the output image is an image in which the region of the main pancreatic duct is labeled.

The SS models 22A and 22B are constructed by a convolutional neural network (CNN), such as residual networks (ResNet) or U-shaped networks (U-Net).

It should be noted that the tubular tissue extraction unit 22 includes the two SS models 22A and 22B in the above description, but the present disclosure is not limited to this. One SS model may be used to extract the pancreas and the main pancreatic duct from the target image G0. In addition, the main pancreatic duct may be directly extracted from the target image G0 without extracting the pancreas.

In addition, the extraction of the target organ is not limited to the extraction using the SS model. Any method of extracting the target organ from the target image G0, such as template matching or threshold value processing for a CT value, can be applied.

In addition, the extraction of the main pancreatic duct is also not limited to the extraction using the SS model. Any method of extracting the pancreas from the target image G0, such as template matching or threshold value processing for a CT value, can be applied. In addition, the main pancreatic duct may be extracted using the method disclosed in JP2014-064824A described above.

In a case in which the method disclosed in JP2014-064824A is used, the tubular tissue extraction unit 22 searches for a linear structure by calculating an eigenvalue of a 3×3 Hessian matrix for each local region in the pancreas. In the region including the linear structure, one of the three eigenvalues of the Hessian matrix is close to zero, and the other two are relatively large. In addition, the eigenvector corresponding to the eigenvalue close to zero indicates a principal axis direction of the linear structure. By using the relationship, the tubular tissue extraction unit 22 determines the linear structure likelihood based on the eigenvalue of the Hessian matrix for each local region and detects the center point of the local region in which the linear structure is identified as a candidate point.

Then, the candidate points detected through the search are connected based on a predetermined algorithm. Accordingly, a tree structure consisting of the candidate points and blood vessel branches connecting the candidate points is constructed, and the tree structure is extracted as the route of the main pancreatic duct. Subsequently, a contour of the main pancreatic duct (an outer wall of the main pancreatic duct) is identified in a cross section perpendicular to the route of the main pancreatic duct for each of the detected candidate points based on values (CT values) of peripheral voxels. Shape identification is performed using a well-known segmentation method represented by Graph-Cuts. By the processing described above, it is possible to extract the route of the main pancreatic duct and the main pancreatic duct.

The lesion extraction unit 23 extracts a lesion region, which is a region such as a tumor in the periphery of the main pancreatic duct, which is a tubular tissue region, in a region in the pancreas. To this end, the lesion extraction unit 23 consists of an SS model 23A subjected to machine learning to extract the lesion region in the periphery of the main pancreatic duct in the region of the pancreas. In the present embodiment, the input image of the SS model 23A is an image of a pancreas region in the target image G0, the extraction object is a lesion, and the output image is an image in which the lesion region is labeled. It should be noted that, in a case in which the lesion region cannot be extracted from the region in the pancreas, the lesion extraction unit 23 outputs information indicating that there is no lesion. In this case, the display control unit 27 performs a notification indicating that there is no lesion, as will be described below.

Figure 4:
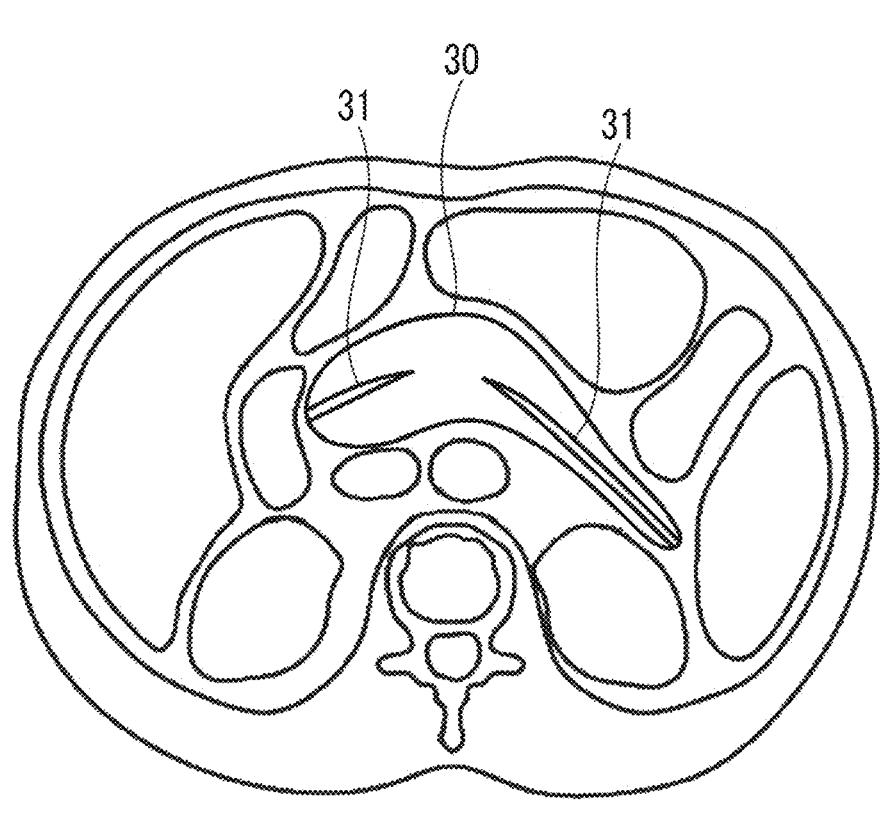
FIG. 4 is a diagram illustrating an extraction result of a tubular tissue region.

Here, the tubular tissue extraction unit 22 extracts the main pancreatic duct in the pancreas as the tubular tissue region as described above, but in a portion in which a lesion such as a tumor is present, the main pancreatic duct 31 in the pancreas 30 may be separated or the main pancreatic duct may be narrowed as illustrated in FIG. 4, and the main pancreatic duct may not be extracted. Therefore, the separation specifying unit 24 specifies a separated part in the tubular tissue region extracted by the tubular tissue extraction unit 22. In the present embodiment, a separated part in the main pancreatic duct 31 in the pancreas 30 extracted by the tubular tissue extraction unit 22 is specified.

To this end, the separation specifying unit 24 first detects an endpoint of the main pancreatic duct 31 extracted by the tubular tissue extraction unit 22. Then, the separation specifying unit 24 determines whether or not the other endpoint of the main pancreatic duct is present through the pancreas parenchyma within a predetermined distance Th0 centered on the detected endpoint. Then, in a case in which the other endpoint is present through the pancreas parenchyma within the predetermined distance Th0 centered on the endpoint, the separation specifying unit 24 considers that the main pancreatic duct is separated between the two endpoints and specifies a region between the endpoints as the separated part.

Figure 5:
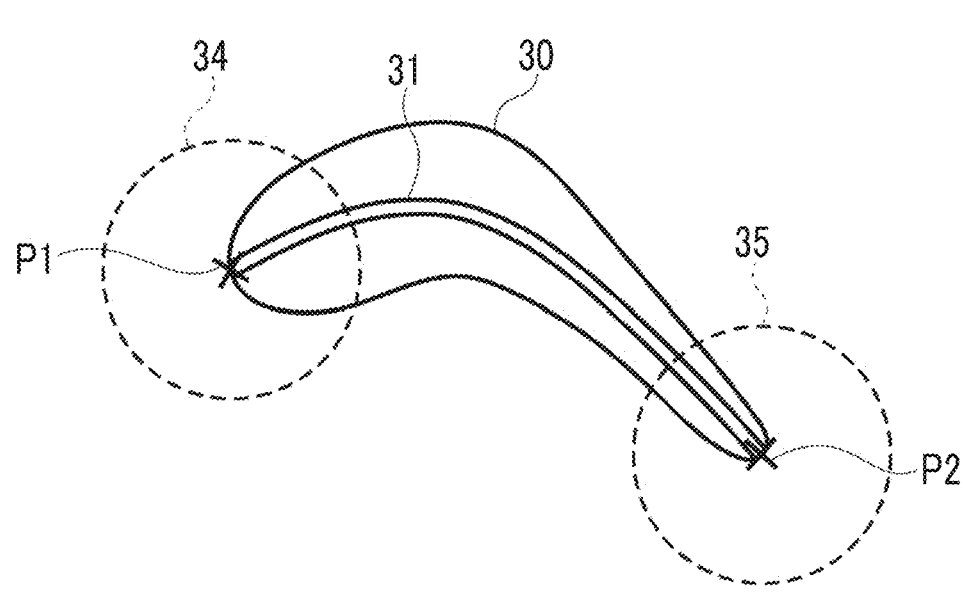
FIG. 5 is a diagram illustrating specification of a separated part.
Figure 6:
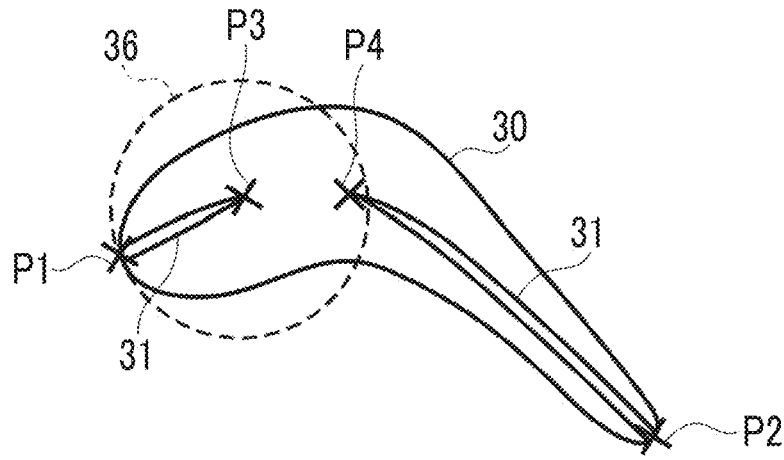
FIG. 6 is a diagram illustrating specification of the separated part.

FIGS. 5 and 6 are diagrams illustrating specification of the separated part. As illustrated in FIG. 5, in a case in which the main pancreatic duct 31 is not separated in the pancreas 30, two endpoints P1 and P2 are detected in the main pancreatic duct 31. FIG. 5 illustrates circles 34 and 35 whose radius is a predetermined distance Th0 centered on each of the endpoints P1 and P2, respectively. As illustrated in FIG. 5, within the predetermined distance Th0 centered on the endpoints P1 and P2, the other endpoints of the main pancreatic duct are absent through the pancreas parenchyma. Therefore, in the case as illustrated in FIG. 5, the separation specifying unit 24 determines that there is no separated part.

On the other hand, as illustrated in FIG. 6, in a case in which the main pancreatic duct 31 is separated in the pancreas 30, four endpoints P1, P2, P3, and P4 are detected in the main pancreatic duct 31. FIG. 6 illustrates only the circle 36 whose radius is a predetermined distance Th0 centered on the endpoint P3. As illustrated in FIG. 6, within the predetermined distance Th0 centered on the endpoint P3, another endpoint P4 of the main pancreatic duct is present through the pancreas parenchyma. Therefore, in the case as illustrated in FIG. 6, the separation specifying unit 24 specifies a region between the endpoint P3 and the endpoint P4 as the separated part.

It should be noted that, in a case in which the main pancreatic duct 31 is not separated, the separation specifying unit 24 outputs information to that effect, and the processing of the determination unit 25 and the correction unit 26 described below is not performed. In this case, the display control unit 27 may perform a notification indicating that the main pancreatic duct 31 is not separated, but may not perform any notification.

The determination unit 25 and the correction unit 26 correct the extraction result of the main pancreatic duct 31, as necessary, based on the positional information of the lesion region. First, the determination unit 25 will be described. The determination unit 25 determines whether or not to connect the separated parts of the main pancreatic duct 31 based on the positional information of the lesion region extracted by the lesion extraction unit 23. Specifically, the determination unit 25 determines whether or not the lesion region is present in the separated parts, and determines to connect the separated parts in a case in which it is determined that the lesion region is absent in the separated parts.

Figure 7:
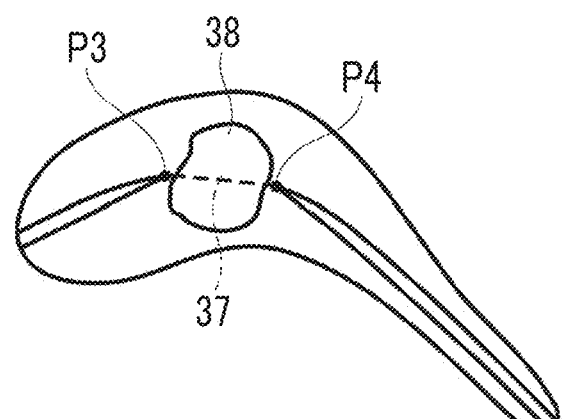
FIG. 7 is a diagram illustrating determination of whether or not to connect the separated parts.
Figure 8:
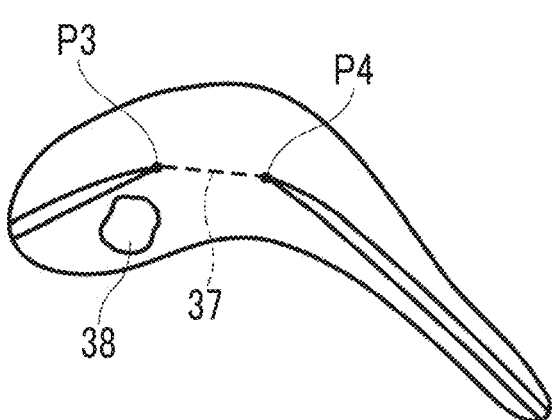
FIG. 8 is a diagram illustrating determination of whether or not to connect the separated parts.

In the present embodiment, the positional information of the lesion region is the coordinates of each pixel in the lesion region. FIG. 7 is a diagram illustrating determination of whether or not to connect the separated parts. For the determination, the determination unit 25 sets a straight line 37 connecting the endpoints of the main pancreatic duct 31 in the separated parts, as illustrated in FIG. 7. Then, the determination unit 25 determines whether or not a lesion region 38 intersects the straight line 37. As illustrated in FIG. 7, in a case in which the lesion region 38 intersects the straight line 37, it can be considered that the main pancreatic duct 31 is separated due to the presence of the lesion. On the other hand, as illustrated in FIG. 8, in a case in which the lesion region 38 does not intersect the straight line 37, due to the reason that the extraction failure of the main pancreatic duct 31 or the extraction is impossible due to the stenosis of the main pancreatic duct 31, the main pancreatic duct 31 should be present in the separated part.

Therefore, the determination unit 25 determines that the lesion region is present in the separated part in a case in which the lesion region 38 intersects the straight line 37, and determines that the lesion region is absent in the separated part in a case in which the lesion region does not intersect the straight line 37. Then, in a case in which it is determined that the lesion region is absent in the separated parts, the determination unit 25 determines to connect the separated parts. In addition, in a case in which it is determined that the lesion region is present in the separated part, the determination unit 25 determines not to connect the separated parts.

It should be noted that, as illustrated in FIG. 7, instead of setting the straight line 37 connecting the endpoints P3 and P4 of the main pancreatic duct 31, a line segment connecting the endpoints P3 and P4 may be set so that the endpoints P3 and P4 are smoothly connected to the extracted main pancreatic duct 31 by higher order interpolation such as spline interpolation using a plurality of coordinate values on the centerline of the extracted main pancreatic duct 31. In this case, the determination unit 25 determines whether or not the lesion region is present in the separated part depending on whether or not the lesion region 38 intersects the set line segment.

The correction unit 26 corrects the extraction result of the main pancreatic duct 31 according to the determination result by the determination unit 25. Specifically, in a case in which the determination unit 25 determines to connect the separated parts, the correction unit 26 corrects the extraction result of the main pancreatic duct 31 such that the separated parts in the main pancreatic duct 31 are connected. On the other hand, in a case in which the determination unit 25 determines not to connect the separated parts, the correction unit 26 does not correct the extraction result of the main pancreatic duct 31.

Figure 9:
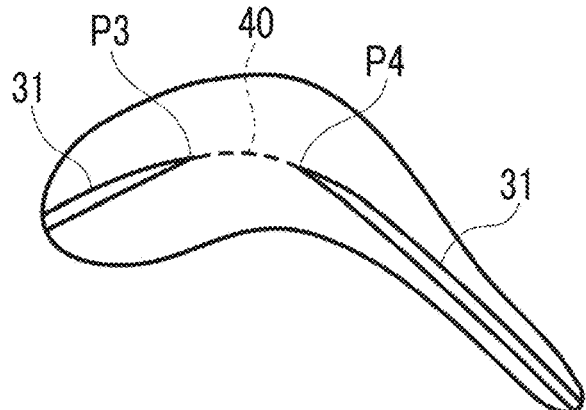
FIG. 9 is a diagram illustrating connection of the separated parts.

FIG. 9 is a diagram illustrating connection of the separated parts. The correction unit 26 derives a line segment 40 smoothly connecting the endpoints P3 and P4 of the main pancreatic duct 31 to the extracted main pancreatic duct 31 by higher order interpolation such as spline interpolation using a plurality of coordinate values on the centerline of the extracted main pancreatic duct 31. Then, the endpoints P3 and P4 are connected along the derived line segment 40. It should be noted that the endpoints P3 and P4 may be connected along a straight line connecting the endpoints P3 and P4 instead of the line segment 40 by the higher order interpolation.

Figure 10:
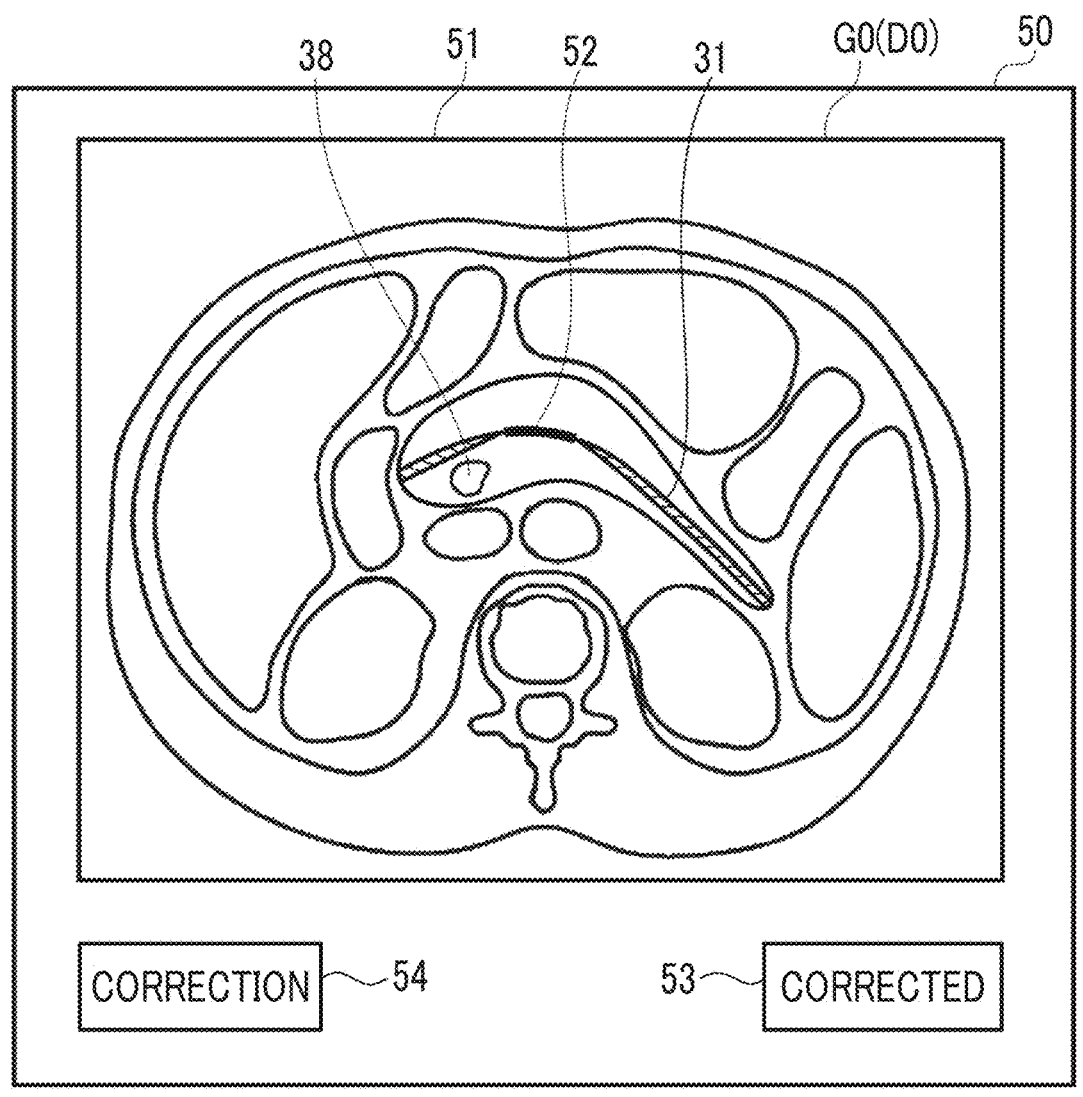
FIG. 10 is a diagram illustrating a display screen of a target image.

The display control unit 27 displays the target image G0 on the display 14 such that whether the main pancreatic duct 31 has been corrected or not is distinguishable. Specifically, in a case in which the extraction result of the main pancreatic duct 31 is corrected, the target image G0 is displayed on the display 14 such that the corrected part in the main pancreatic duct 31 can be distinguished. FIG. 10 is a diagram illustrating a display screen of the target image G0. As illustrated in FIG. 10, a display screen 50 has an image display region 51 for displaying the target image G0. One tomographic image DO included in the target image G0 is displayed in the image display region 51. The displayed tomographic image DO can be switched by, for example, scrolling a scroll button of a mouse, which is the input device 15.

As illustrated in FIG. 10, a region of the main pancreatic duct 31 is highlighted and displayed in the target image G0. In addition, in the separated part of the main pancreatic duct 31, a connection region 52 representing that the separated parts are connected is displayed. The connection region 52 is highlighted and displayed so as to be distinguishable from the region of the pancreas 30. For example, a color of the connection region 52 is highlighted and displayed in a color different from a color of the main pancreatic duct 31. In FIG. 10, the region of the main pancreatic duct 31 is hatched and the connection region 42 is filled in to indicate that the colors are different.

In addition, below the image display region 51, a text 53 of "corrected" representing that the extraction result of the main pancreatic duct 31 has been corrected is displayed. It should be noted that, in a case in which the determination unit 25 determines not to connect the separated parts and the extraction result of the main pancreatic duct 31 has not been corrected, a text of "not corrected" is displayed. Even in a case in which the extraction result of the main pancreatic duct 31 has not been corrected, the region of the main pancreatic duct 31 may be highlighted and displayed by giving a color or the like. In addition, the highlighted display may be switched on or off by an instruction from the input device 15.

Figure 11:
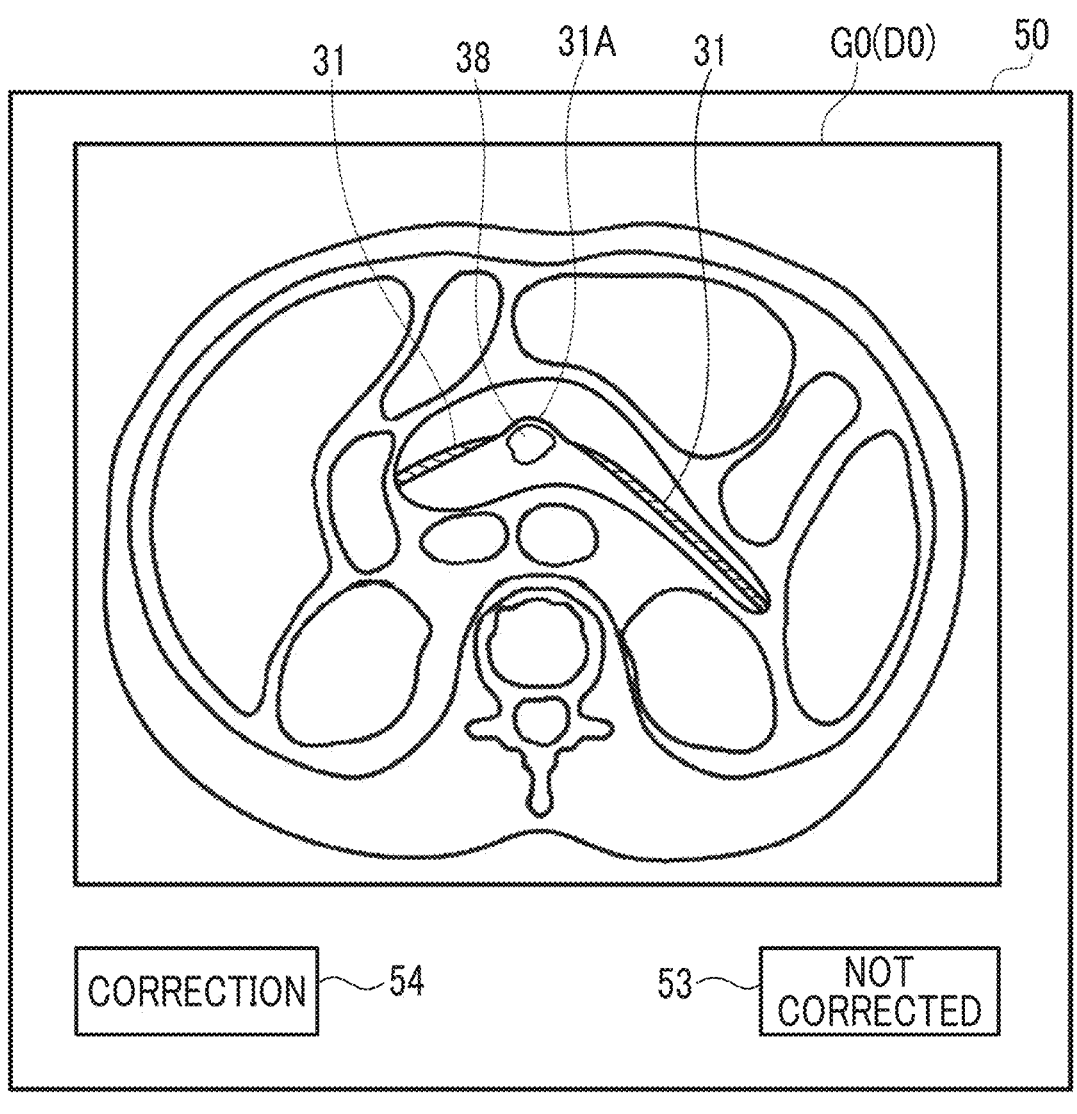
FIG. 11 is a diagram illustrating a display screen of the target image.

It should be noted that, in a case in which the lesion region is present in the separated part, the separated parts are not connected, but as a result of the image interpretation of the target image G0 by an image interpretation doctor, the main pancreatic duct 31 is not actually separated, although it is stenotic. In such a case, the correction unit 26 may be able to correct the extraction result of the main pancreatic duct 31 such that the main pancreatic duct 31 is connected in response to the instruction from the input device 15. FIG. 11 is a diagram illustrating the correction of the extraction result. As illustrated in FIG. 11, since the lesion region 38 is present in the separated part of the main pancreatic duct 31 displayed on the display screen 50, the text 53 of "not corrected" is displayed. However, because the narrowed main pancreatic duct 31A is present above the lesion region 38, the main pancreatic duct 31 on the left and right side of the lesion region 38 is not separated.

In this case, the image interpretation doctor selects a correction button 54. Accordingly, it becomes possible to perform drawing on the target image G0 using the input device 15. The image interpretation doctor corrects the extraction result of the main pancreatic duct 31 so as to connect the main pancreatic duct 31 on the left and right sides of the lesion region 38 by drawing a line segment along the narrowed main pancreatic duct 31A using the input device 15.

Figure 12:
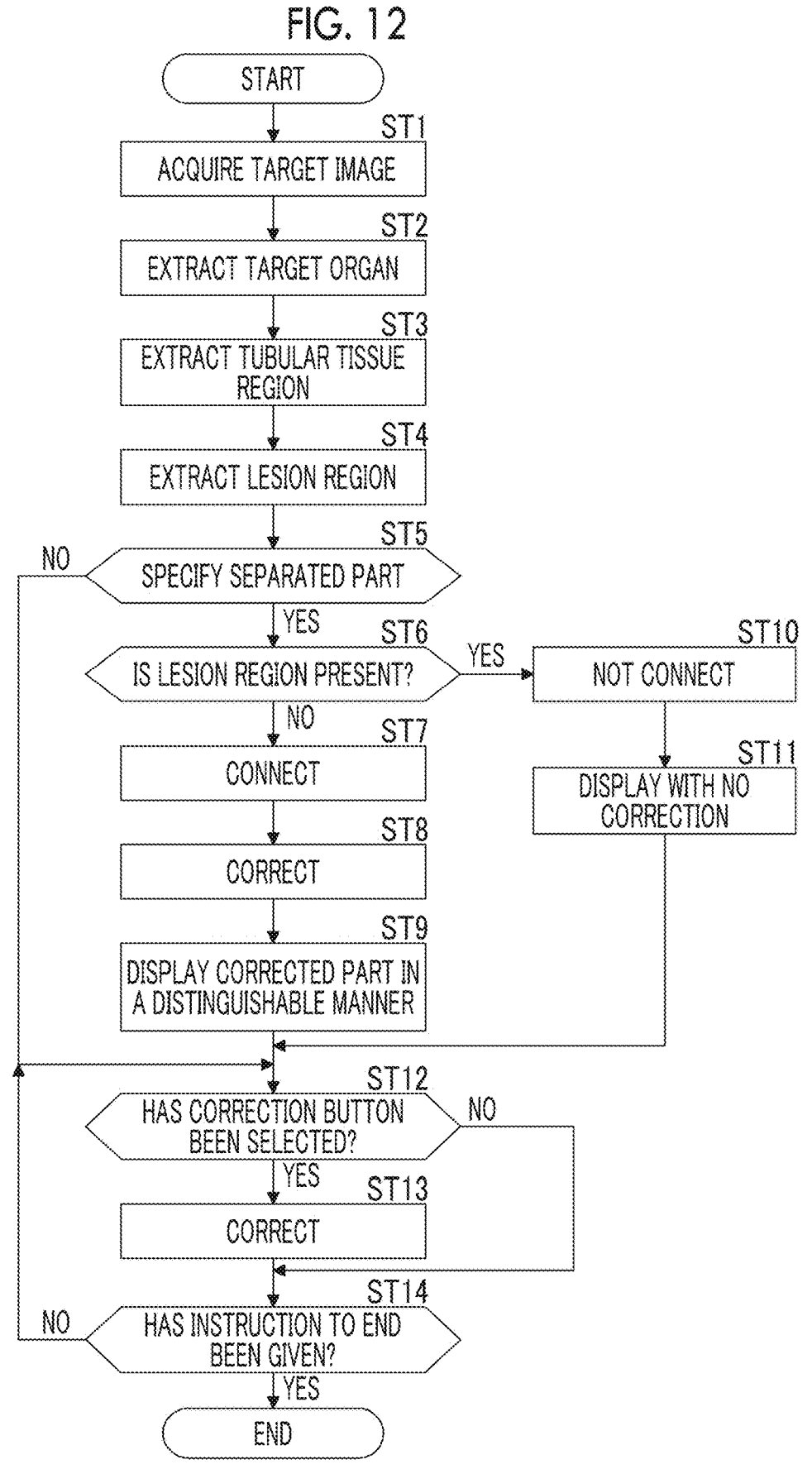
FIG. 12 is a flowchart illustrating processing performed in the present embodiment.

Hereinafter, processing performed in the present embodiment will be described. FIG. 12 is a flowchart illustrating the processing performed in the present embodiment. First, the image acquisition unit 21 acquires the target image G0 from the storage 13 (Step ST1), the tubular tissue extraction unit 22 extracts the pancreas, which is the target organ, from the target image G0 (Step ST2), and further extracts the region of the main pancreatic duct, which is a tubular tissue region in the pancreas (Step ST3).

Subsequently, the lesion extraction unit 23 extracts the lesion region, which is a region such as a tumor in the periphery of the main pancreatic duct, in the region in the pancreas (Step ST4). Hereinafter, a case in which the lesion region is extracted will be described. Next, the separation specifying unit 24 specifies the separated part of the main pancreatic duct, which is the extracted tubular tissue region (Step ST5). In a case in which the separated part is not specified (Step ST5: NO), the separation specifying unit 24 outputs information to that effect, and the processing proceeds to Step ST12.

In a case in which the separated part is specified (Step ST5: YES), the determination unit 25 determines whether or not to connect the separated parts of the main pancreatic duct 31 based on the positional information of the lesion region extracted by the lesion extraction unit 23. That is, the determination unit 25 determines whether or not the lesion region is present in the separated part (Step ST6). Then, in a case in which it is determined that the lesion region is absent in the separated part (Step ST6: NO), the determination unit 25 determines to connect the separated parts (Step ST7), and the correction unit 26 corrects extraction result of the main pancreatic duct 31 such that the separated parts in the main pancreatic duct 31 are connected (Step ST8). Then, the display control unit 27 displays the target image G0 on the display 14 such that the corrected part in the main pancreatic duct 31 can be distinguished (Step ST9). After that, the target image G0 is interpreted by the image interpretation doctor.

On the other hand, in a case in which the determination unit 25 determines that the lesion region is present in the separated part (Step ST6: YES), the determination unit 25 determines not to connect the separated parts (Step ST10), the display control unit 27 performs display with no correction (Step ST11), and the processing proceeds to Step ST12.

In Step ST12, it is determined whether or not the correction button 54 has been selected, and in a case in which the determination in Step ST12 is negative, the processing proceeds to Step ST14. In a case in which the determination in Step ST12 is affirmative, the route of the main pancreatic duct 31 is corrected in response to the instruction to correct the route of the main pancreatic duct 31 by the image interpretation doctor (Step ST13). Then, it is determined whether or not an instruction to end has been given (Step ST14), and in a case in which the determination in Step ST14 is negative, the processing returns to Step ST12. In a case in which the determination in Step ST14 is affirmative, the processing ends.

As described above, in the present embodiment, the extraction result of the tubular tissue region is corrected, as necessary, based on the positional information of the lesion region. Therefore, in a case in which the lesion region is located at the separated part of the tubular tissue region, it can be assumed that the tubular tissue is actually separated due to the lesion, so the extraction result of the tubular tissue region can be left uncorrected. In addition, in a case in which the lesion region is not located at the separated part of the tubular tissue region, it can be assumed that the tubular tissue is not actually separated, and the tubular tissue region is separated due to a failure of extracting the tubular tissue region or the like. From the above, it is possible to correct the extraction result of the tubular tissue region. Therefore, it is possible to improve the extraction accuracy of the tubular tissue in consideration of whether or not the tubular tissue is actually separated.

In addition, by displaying the target image G0 such that whether the tubular tissue region has been corrected or not is distinguishable, it is possible to easily distinguish that the tubular tissue region has been corrected.

In addition, in a case in which the extraction result of the tubular tissue region has been corrected, by displaying the target image such that the corrected part in the tubular tissue region is distinguishable, it is possible to easily distinguish the corrected part in the tubular tissue region.

In addition, by correcting the route of the tubular tissue region in response to the instruction to correct the route of the tubular tissue region with respect to the target image G0, it becomes possible to perform correction even in a case in which the tubular tissue region is not separated or the corrected route is wrong.

Figure 13:
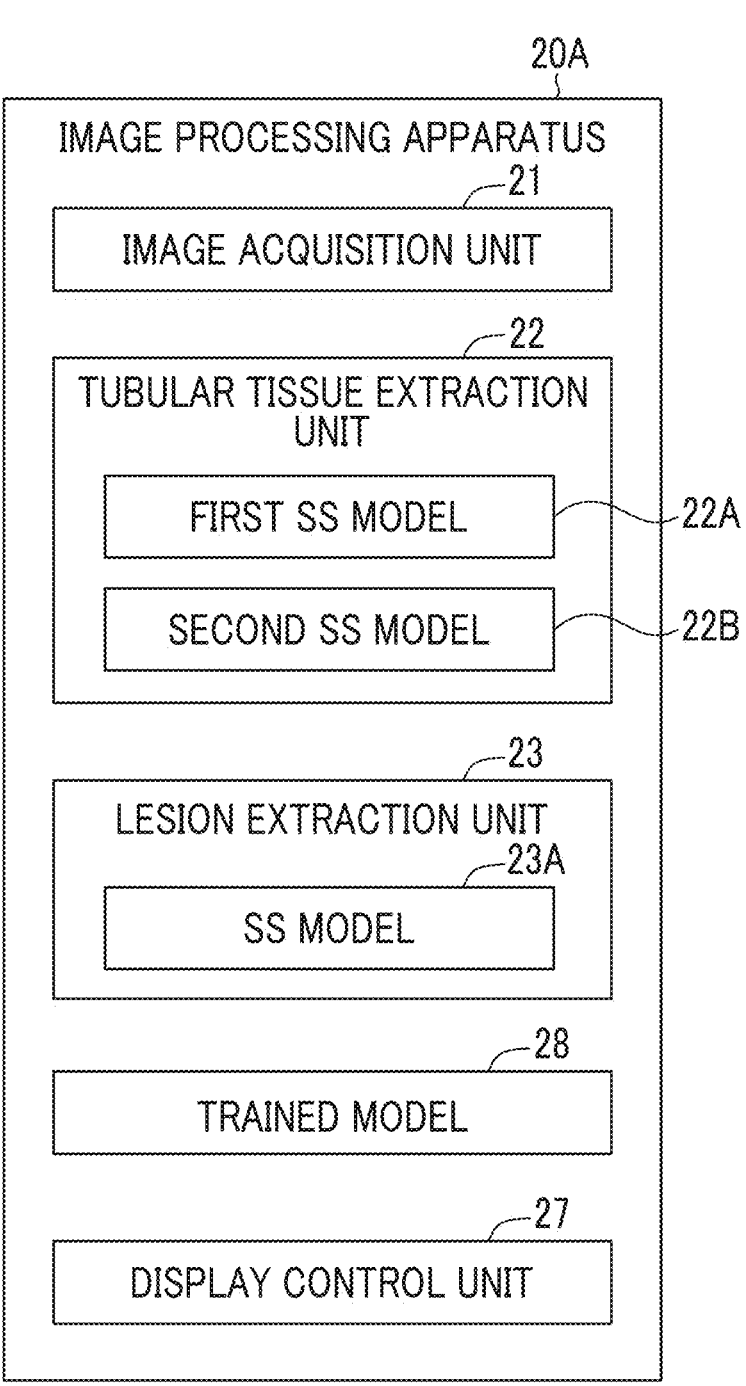
FIG. 13 is a functional configuration diagram of an image processing apparatus according to the second embodiment.

Hereinafter, a second embodiment of the present disclosure will be described. FIG. 13 is a diagram illustrating a functional configuration of an image processing apparatus according to the second embodiment. It should be noted that, in FIG. 13, the same reference numerals are assigned to the same configurations as those in FIG. 3, and the detailed description thereof will be omitted. As illustrated in FIG. 13, an image processing apparatus 20A according to the second embodiment is different from the first embodiment in that a trained model 28 that outputs the tubular tissue region in which the extraction result is corrected, as necessary, is provided in a case in which the tubular tissue region and the positional information of the lesion region are input, instead of the separation specifying unit 24, the determination unit 25, and the correction unit 26.

The trained model 28 is a machine learning model that is trained to derive the target image G0 in which the extraction result of the tubular tissue region is corrected, as necessary, from the target image G0, the tubular tissue region extracted by the tubular tissue extraction unit 22, and the lesion region 38 extracted by the lesion extraction unit 23. Similar to the SS model, the trained model 28 consists of a convolutional neural network. The inputs of the trained model 28 are the tomographic image D0 that constitutes the target image G0, the tubular tissue region extracted in the tomographic image D0, and the lesion region extracted in the tomographic image D0. The output of the trained model 28 is the target image G0 in which the extraction result of the tubular tissue region is corrected, as necessary. It should be noted that the trained model 28 receives the coordinates of each pixel of the tubular tissue region in the tomographic image D0 and the coordinates of each pixel of the lesion region in the tomographic image D0. Therefore, the lesion region input to the trained model 28 includes the positional information of the lesion region.

Figure 14:
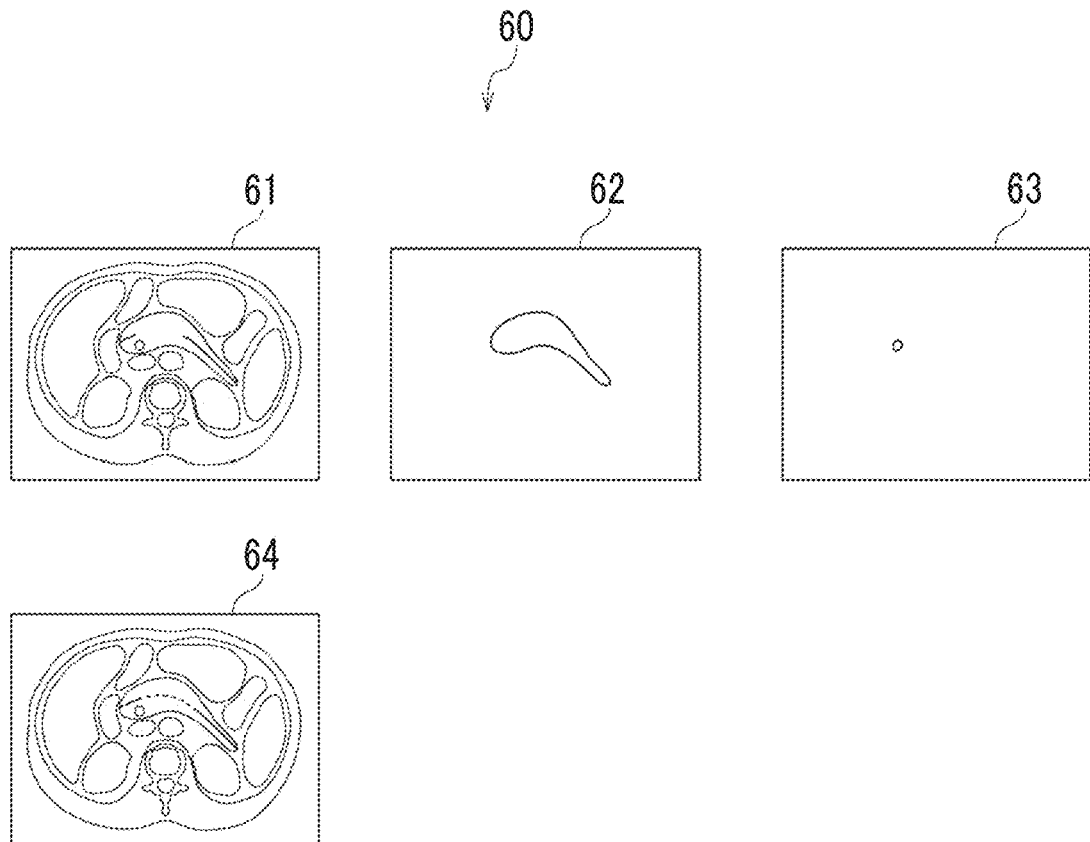
FIG. 14 is a diagram illustrating teacher data for training a trained model.

FIG. 14 is a diagram illustrating teacher data used for training of the trained model 28. As illustrated in FIG. 14, the teacher data 60 includes a teacher image 61, a tubular tissue region 62 extracted from the teacher image 61, a lesion region 63 extracted from the teacher image 61, and a corrected image 64 in which an extraction result of the tubular tissue region 62 in the teacher image 61 is corrected. The trained model 28 is constructed by training the convolutional neural network such that the corrected image 64 is output in a case in which the teacher image 61, the tubular tissue region 62, and the lesion region 63 are input.

As in the second embodiment, the extraction accuracy of the tubular tissue can be improved by using the trained model 28 that has been trained to derive the target image G0 in which the extraction result of the tubular tissue region is corrected, as necessary, from the target image G0, the tubular tissue region extracted by the tubular tissue extraction unit 22, and the lesion region extracted by the lesion extraction unit 23 in consideration of whether or not the tubular tissue is actually separated.

It should be noted that, in each embodiment described above, the tubular tissue is the main pancreatic duct in the pancreas, but the present disclosure is not limited to this. The technology of the present disclosure can also be applied to a case of extracting any tubular tissue, such as bile ducts, blood vessels, esophagus, bronchi, small and large intestines, from a medical image.

In addition, in the embodiment described above, the CT image is used as the target image G0, but the present disclosure is not limited to this. In addition to the three-dimensional image, such as the MRI image, any image, such as a radiation image acquired by simple imaging, can be used as the target image G0.

In addition, in each embodiment described above, various processors shown below can be used as the hardware structure of the processing units that execute various types of processing, such as the image acquisition unit 21, the tubular tissue extraction unit 22, the lesion extraction unit 23, the separation specifying unit 24, the determination unit 25, the correction unit 26, the display control unit 27, and the trained model 28. As described above, the various processors include, in addition to the CPU that is a general-purpose processor which executes software (program) to function as various processing units, a programmable logic device (PLD) that is a processor of which a circuit configuration can be changed after manufacture, such as a field programmable gate array (FPGA), and a dedicated electrical circuit that is a processor having a circuit configuration which is designed for exclusive use to execute a specific processing, such as an application specific integrated circuit (ASIC).

One processing unit may be configured by one of these various processors or may be configured by a combination of two or more processors of the same type or different types (for example, a combination of a plurality of FPGAs or a combination of the CPU and the FPGA). In addition, a plurality of processing units may be formed of one processor.

As an example of configuring the plurality of processing units by one processor, first, as represented by a computer of a client, a server, and the like, there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

What is claimed is:

1. An image processing apparatus comprising:

at least one processor, wherein the processor is configured to:

extract a tubular tissue region from a medical image including a tubular tissue;

extract a lesion region in a periphery of the tubular tissue region from the medical image; and correct an extraction result of the tubular tissue region, as necessary, based on positional information of the lesion region.

2. The image processing apparatus according to claim 1, wherein the processor is configured to:

specify separated parts in the tubular tissue region;

determine whether or not to connect the separated parts of the tubular tissue region based on the positional information of the lesion region; and correct the extraction result of the tubular tissue region such that the separated parts in the tubular tissue region are connected, in a case in which it is determined that the separated parts are to be connected.

3. The image processing apparatus according to claim 2, wherein the processor is configured to determine whether or not the lesion region is present in the separated parts based on the positional information of the lesion region, and determine to connect the separated parts in a case in which it is determined that the lesion region is absent in the separated parts.

4. The image processing apparatus according to claim 1, wherein the processor is configured to function as a trained model that outputs the medical image in which the extraction result of the tubular tissue region is corrected, as necessary, in a case in which the medical image, the tubular tissue region, and the positional information of the lesion region are input.

5. The image processing apparatus according to claim 1, wherein the processor is configured to display the medical image such that whether the tubular tissue region has been corrected or not is distinguishable.

6. The image processing apparatus according to claim 2, wherein the processor is configured to display the medical image such that whether the tubular tissue region has been corrected or not is distinguishable.

7. The image processing apparatus according to claim 3, wherein the processor is configured to display the medical image such that whether the tubular tissue region has been corrected or not is distinguishable.

8. The image processing apparatus according to claim 4, wherein the processor is configured to display the medical image such that whether the tubular tissue region has been corrected or not is distinguishable.

9. The image processing apparatus according to claim 5, wherein the processor is configured to display the medical image such that a corrected part in the tubular tissue region is distinguishable in a case in which the extraction result of the tubular tissue region has been corrected.

10. The image processing apparatus according to claim 6, wherein the processor is configured to display the medical image such that a corrected part in the tubular tissue region is distinguishable in a case in which the extraction result of the tubular tissue region has been corrected.

11. The image processing apparatus according to claim 7, wherein the processor is configured to display the medical image such that a corrected part in the tubular tissue region is distinguishable in a case in which the extraction result of the tubular tissue region has been corrected.

12. The image processing apparatus according to claim 8, wherein the processor is configured to display the medical image such that a corrected part in the tubular tissue region is distinguishable in a case in which the extraction result of the tubular tissue region has been corrected.

13. The image processing apparatus according to claim 5, wherein the processor is configured to correct a route of the tubular tissue region in response to an instruction to correct the route of the tubular tissue region for the medical image.

14. The image processing apparatus according to claim 9, wherein the processor is configured to correct a route of the tubular tissue region in response to an instruction to correct the route of the tubular tissue region for the medical image.

15. The image processing apparatus according to claim 1, wherein the tubular tissue is a main pancreatic duct, and the lesion region is a lesion region in a pancreas.

16. An image processing method comprising:

extracting a tubular tissue region from a medical image including a tubular tissue;

extracting a lesion region in a periphery of the tubular tissue region from the medical image; and correcting an extraction result of the tubular tissue region, as necessary, based on positional information of the lesion region.

17. A non-transitory computer-readable storage medium that stores an image processing program causing a computer to execute:

a procedure of extracting a tubular tissue region from a medical image including a tubular tissue;

a procedure of extracting a lesion region in a periphery of the tubular tissue region from the medical image; and a procedure of correcting an extraction result of the tubular tissue region, as necessary, based on positional information of the lesion region.

\* \* \* \* \*